US012439841B2

(12) United States Patent
Glovier

(10) Patent No.: US 12,439,841 B2
(45) Date of Patent: Oct. 14, 2025

(54) SYSTEM AND METHOD FOR DETERMINING OPERATIONAL STATUS OF A TILLAGE IMPLEMENT

(71) Applicant: CNH Industrial America LLC, New Holland, PA (US)

(72) Inventor: Scott Glovier, Lombard, IL (US)

(73) Assignee: CNH Industrial America LLC, New Holland, PA (US)

( * ) Notice: Subject to any disclaimer, the term of this patent is extended or adjusted under 35 U.S.C. 154(b) by 426 days.

(21) Appl. No.: 17/994,868

(22) Filed: Nov. 28, 2022

(65) Prior Publication Data
US 2024/0172578 A1    May 30, 2024

(51) Int. Cl.
*A01B 79/00*    (2006.01)
*A01B 63/24*    (2006.01)
*G01D 5/16*    (2006.01)

(52) U.S. Cl.
CPC .......... *A01B 79/005* (2013.01); *A01B 63/24* (2013.01); *G01D 5/16* (2013.01)

(58) Field of Classification Search
CPC ......... A01B 79/005; A01B 63/24; G01D 5/16
See application file for complete search history.

(56) References Cited

U.S. PATENT DOCUMENTS

| 6,144,910 A * | 11/2000 | Scarlett | A01B 63/023 701/50 |
| 2014/0116735 A1* | 5/2014 | Bassett | A01C 7/203 172/430 |
| 2016/0088787 A1* | 3/2016 | Connell | A01B 63/24 701/33.9 |
| 2020/0352088 A1* | 11/2020 | Arnett | A01B 21/04 |
| 2021/0029865 A1* | 2/2021 | Smith | A01B 76/00 |
| 2021/0045278 A1* | 2/2021 | Henry | A01B 9/003 |
| 2022/0198642 A1* | 6/2022 | Sharma | G06N 20/00 |

OTHER PUBLICATIONS

U.S. Appl. No. 17/837,533, filed Jun. 10, 2022.

* cited by examiner

*Primary Examiner* — Ramsey Refai
(74) *Attorney, Agent, or Firm* — Dority & Manning, P.A.

(57) ABSTRACT

A tillage implement includes a computing system configured to determine the total load being applied to a disk gang of the implement based on data generated by the one or more load sensors. Additionally, the computing system is configured to determine a normalized number of disks on the disk gang based on the surface area of each disk on the disk gang that is in contact with soil in a field across which the tillage implement is traveling. Moreover, the computing system is configured to determine an average load per disk being applied to the disk gang based on the determined total load and the determined normalized number of disks. In addition, the computing system is configured to determine an operational status of the tillage implement based on the determined average load per disk.

20 Claims, 6 Drawing Sheets

SYSTEM AND METHOD FOR DETERMINING OPERATIONAL STATUS OF A TILLAGE IMPLEMENT

FIELD OF THE INVENTION

The present disclosure generally relates to tillage implements and, more particularly, a system and a method for determining operational status of a tillage implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more disk gangs supported on its frame. Each disk gang, in turn, includes a plurality of spaced apart disks that are configured to rotate relative to the soil as the tillage implement travels across the field. The rotation of the disks loosens and/or otherwise agitates the soil to prepare the field for subsequent planting operations.

During tillage operations, field conditions may affect the performance of the tillage implement. For example, field materials, such as residue, soil, rocks, and/or the like, may become trapped or otherwise accumulate between adjacent pairs of disks. When such accumulations of field materials become sufficient to prevent a disk gang from providing adequate tillage to the field (e.g., by slowing or preventing rotation of the disks), the disk gang is plugged. Additionally, differences in soil moisture content and/or soil hardness across the width of the tillage implement affect the levelness of the implement frame. In such instances, the depth of the disks may vary. It may be difficult for the tillage implement operator to determine when a disk gang is plugged, the frame is not level, and/or the like. In this respect, systems have been developed to detect the operational status of the tillage implement during tillage operations. While such systems work well, further improvements are needed.

Accordingly, an improved system and method for determining operational status of a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a tillage implement. The tillage implement includes a frame and a disk gang supported on the frame, with the disk gang including a disk gang shaft and a plurality of disks spaced apart from each other along the disk gang shaft. Furthermore, the tillage implement includes one or more load sensors configured to generate data indicative of a load being applied to the disk gang and a computing system communicatively coupled to the one or more load sensors. In this respect, the computing system is configured to determine a total load being applied to the disk gang based on the data generated by the one or more load sensors. Additionally, the computing system is configured to determine a normalized number of disks on the disk gang based on a surface area of each disk of the plurality of disks that is in contact with soil in a field across which the tillage implement is traveling. Moreover, the computing system is configured to determine an average load per disk being applied to the disk gang based on the determined total load and the determined normalized number of disks. In addition, the computing system is configured to determine an operational status of the tillage implement based on the determined average load per disk.

In another aspect, the present subject matter is directed to a system for determining operational status of a tillage implement. The system includes a disk gang having a disk gang shaft and a plurality of disks spaced apart from each other along the disk gang shaft. Furthermore, the system includes one or more load sensors configured to generate data indicative of a load being applied to the disk gang and a computing system communicatively coupled to the one or more load sensors. In this respect, the computing system is configured to determine a total load being applied to the disk gang based on the data generated by the one or more load sensors. Additionally, the computing system is configured to determine a normalized number of disks on the disk gang based on a surface area of each disk of the plurality of disks that is in contact with soil in a field across which the tillage implement is traveling. Moreover, the computing system is configured to determine an average load per disk being applied to the disk gang based on the determined total load and the determined normalized number of disks. In addition, the computing system is configured to determine an operational status of the tillage implement based on the determined average load per disk.

In a further aspect, the present subject matter is directed to a method for determining operational status of a tillage implement. The tillage implement, in turn, includes a disk gang having a disk gang shaft and a plurality of disks spaced apart from each other along the disk gang shaft. The method includes receiving, with a computing system, load sensor data indicative of a load being applied to the disk gang. Furthermore, the method includes determining, with the computing system, a total load being applied to the disk gang based on the received load sensor data. Additionally, the method includes determining, with the computing system, a normalized number of disks on the disk gang based on a surface area of each disk of the plurality of disks that is in contact with soil in a field across which the tillage implement is traveling. Moreover, the method includes determining, with the computing system, an average load per disk being applied to the disk gang based on the determined total load and the determined normalized number of disks. In addition, the method includes determining, with the computing system, an operational status of the tillage implement based on the determined average load per disk. Furthermore, the method includes initiating, with the computing system, a control action associated with adjusting an operation of the tillage implement based on the determined operational status.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
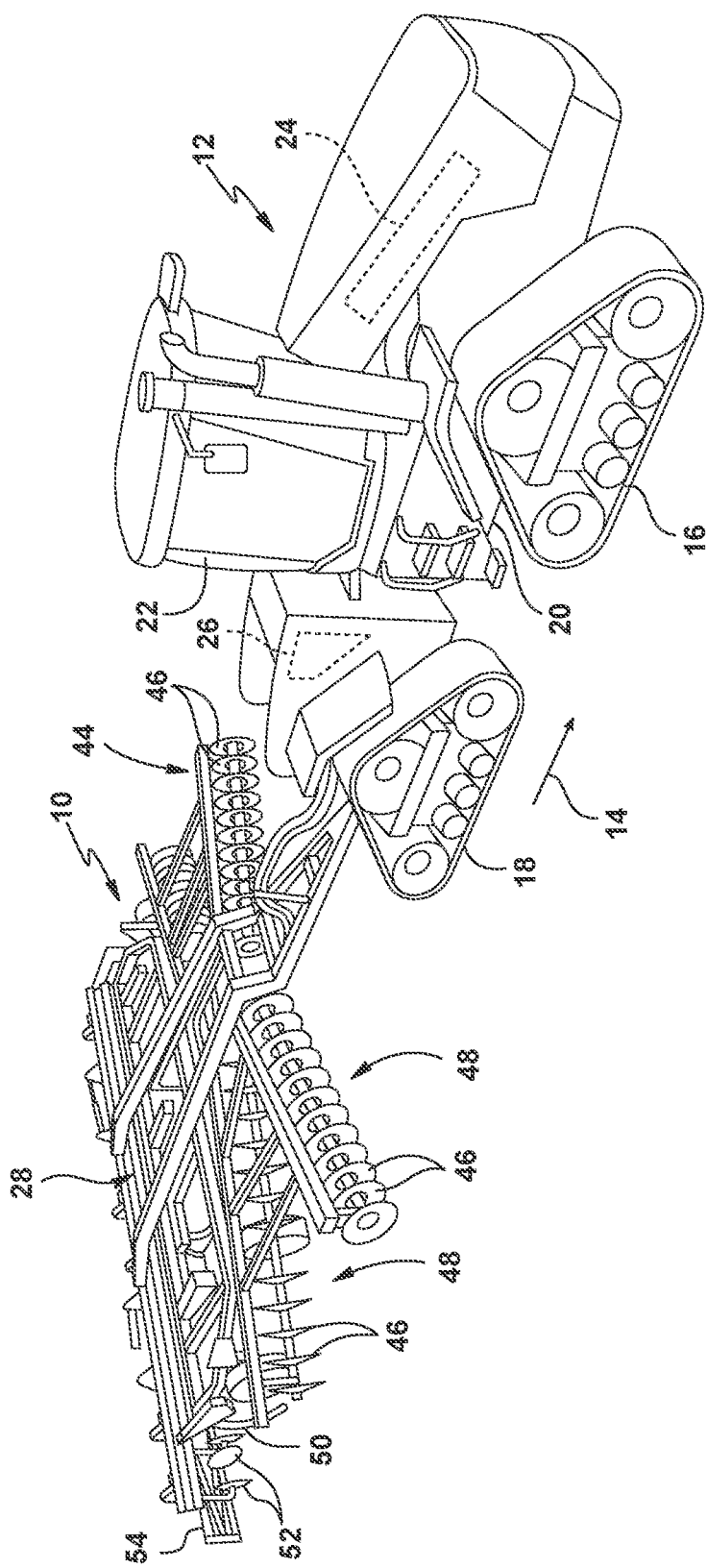
FIG. 1 illustrates a perspective view of one embodiment of a tillage implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for determining operational status of a tillage implement. As will be described below, the tillage implement includes a disk gang having a disk gang shaft and a plurality of disks spaced apart from each other along the disk gang shaft. Furthermore, the tillage implement includes one or more load sensors in operative association with the disk gang. In this respect, as the tillage implement travels across a field to perform a tillage operation thereon, the load sensor(s) is configured to generate data indicative of the load being applied to the disk gang (e.g., by engagement with the soil within the field).

In several embodiments, a computing system is configured to determine the operational status of the tillage implement based on the load sensor data. More specifically, the computing system is configured to determine the total load being applied to the disk gang based on the load sensor data. Additionally, the computing system is configured to determine the normalized number of disks on the disk gang based on the surface area of each disk that is in contact with the soil in the field. For example, in some embodiments, the computing system may determine the normalized number of disks based on the number of disks on the disk gang, the sizes (e.g., the diameter) of such disks, and the nominal depth of such disks. Moreover, the computing system is configured to determine the average load per disk being applied to the disk gang based on the determined total load and the determined normalized number of disks. Thereafter, the computing system is configured to determine the operational status of the tillage implement based on the determined average load per disk. For example, the operational status may be whether the disk gang is plugged, the levelness of a frame of the tillage implement, and/or the like.

Determining operational status of a tillage implement based on the normalized number of disks on a disk gang of the implement improves the operation of the implement. More specifically, the average load per disk being applied to a disk gang can be used to determine various operational statuses of the implement (e.g., disk gang plugging, frame levelness, etc.). Many disk gangs include varying sizes of disks. Thus, simply dividing the total load being applied to the disk gang by the total number of disks may not provide an accurate determination of the operational status as differently sized disks have differing amounts of surface area that engage the soil. For example, the smaller end disks on a disk gang may result in the determined average load per disk being smaller than the actual average load per disk. However, as described above, the disclosed system and method normalize the number of disks on the disk gang based on the surface area of each disk that is in contact with soil before determining the average load per disk. As such, by using the normalized number of disks on the disk gang to determine the average load per disk, the disclosed system and method provide a more accurate determinations of tillage implement operational status.

Figure 2:
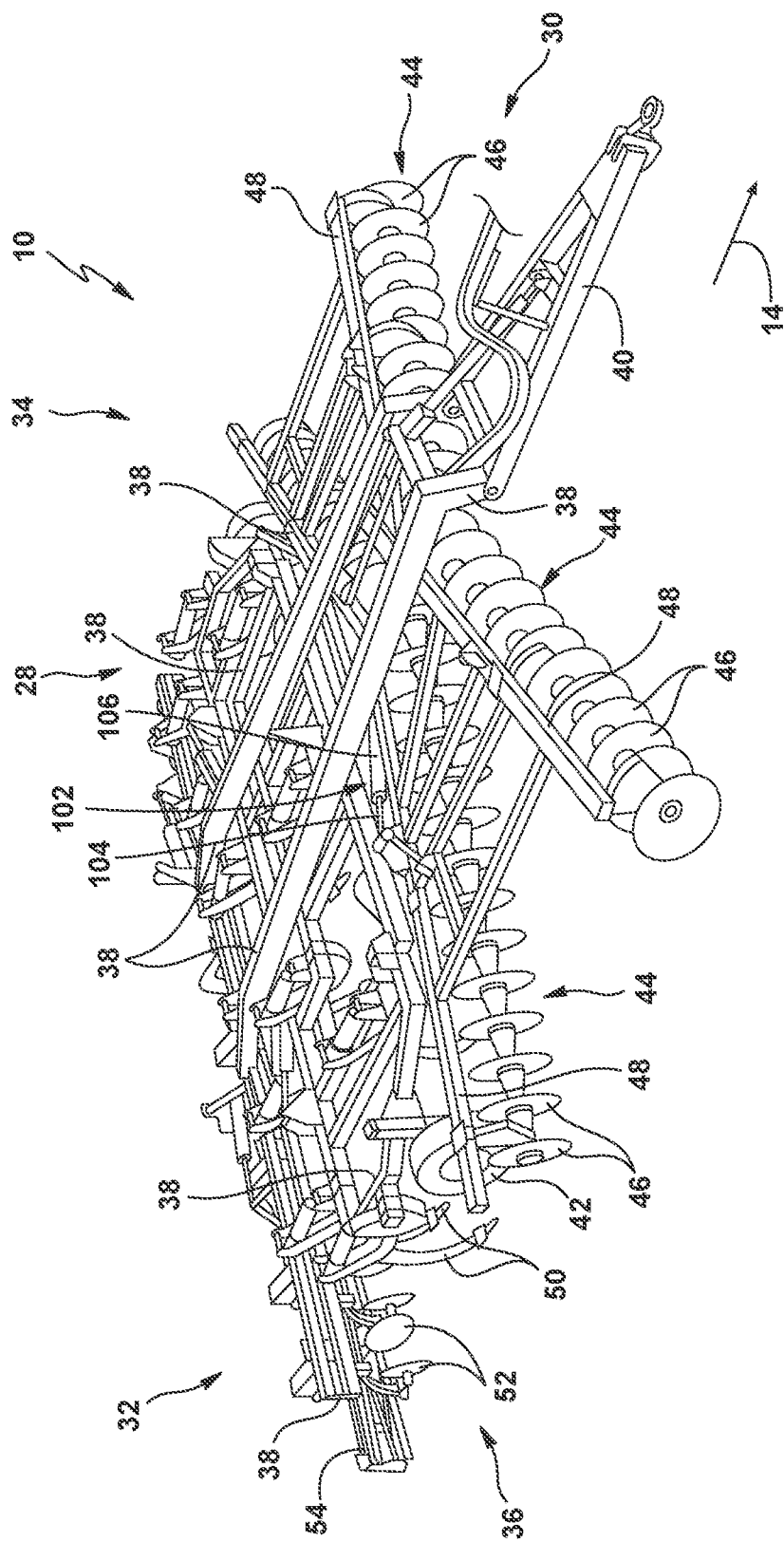
FIG. 2 illustrates an alternative perspective view of the tillage implement shown in FIG. 1, particularly illustrating various components of the tillage implement.

Referring now to the drawings, FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a disk ripper, and the work vehicle 12 is configured as an agricultural tractor. However, in other embodiments, the implement 10 may be configured as any other suitable type of tillage implement. Similarly, the work vehicle 12 may be configured as any other suitable type of vehicle.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 120 shown in FIG. 6) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disks 46. Each disk 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 102 (one is shown). In general, each actuator 102 is configured to move or otherwise adjust the orientation or position of one of the disk gangs 44 relative to the implement frame 28. For example, as shown in the illustrated embodiment, a first end of each actuator 102 (e.g., a rod 104 of the actuator 102) is be coupled to a support arm 48 of the corresponding disk gang 44, while a second end of each actuator 102 (e.g., the cylinder 106 of the actuator 102) is coupled to the frame 28. The rod 104 of each actuator 102 may be configured to extend and/or retract relative to the corresponding cylinder 106 to adjust the angle of the corresponding disk gang 44 relative to a lateral centerline (not shown) of the frame 28 and/or the penetration depth of the associated disks 46. In the illustrated embodiment, each actuator 102 corresponds to a fluid-driven actuator, such as a hydraulic or pneumatic cylinder. However, each actuator 102 may correspond to any other suitable type of actuator, such as an electric linear actuator.

Additionally, as shown, in one embodiment, the implement frame 28 may be configured to support other ground engaging tools. For instance, in the illustrated embodiment, the frame 28 supports a plurality of shanks 50 configured to rip or otherwise till the soil as the implement 10 is towed across the field. Furthermore, in the illustrated embodiment, the frame 28 also supports a plurality of leveling blades 52 and rolling (or crumbler) basket assemblies 54. However, in other embodiments, any other suitable ground-engaging tools may be coupled to and supported by the implement frame 28, such as a plurality closing discs.

Figure 3:
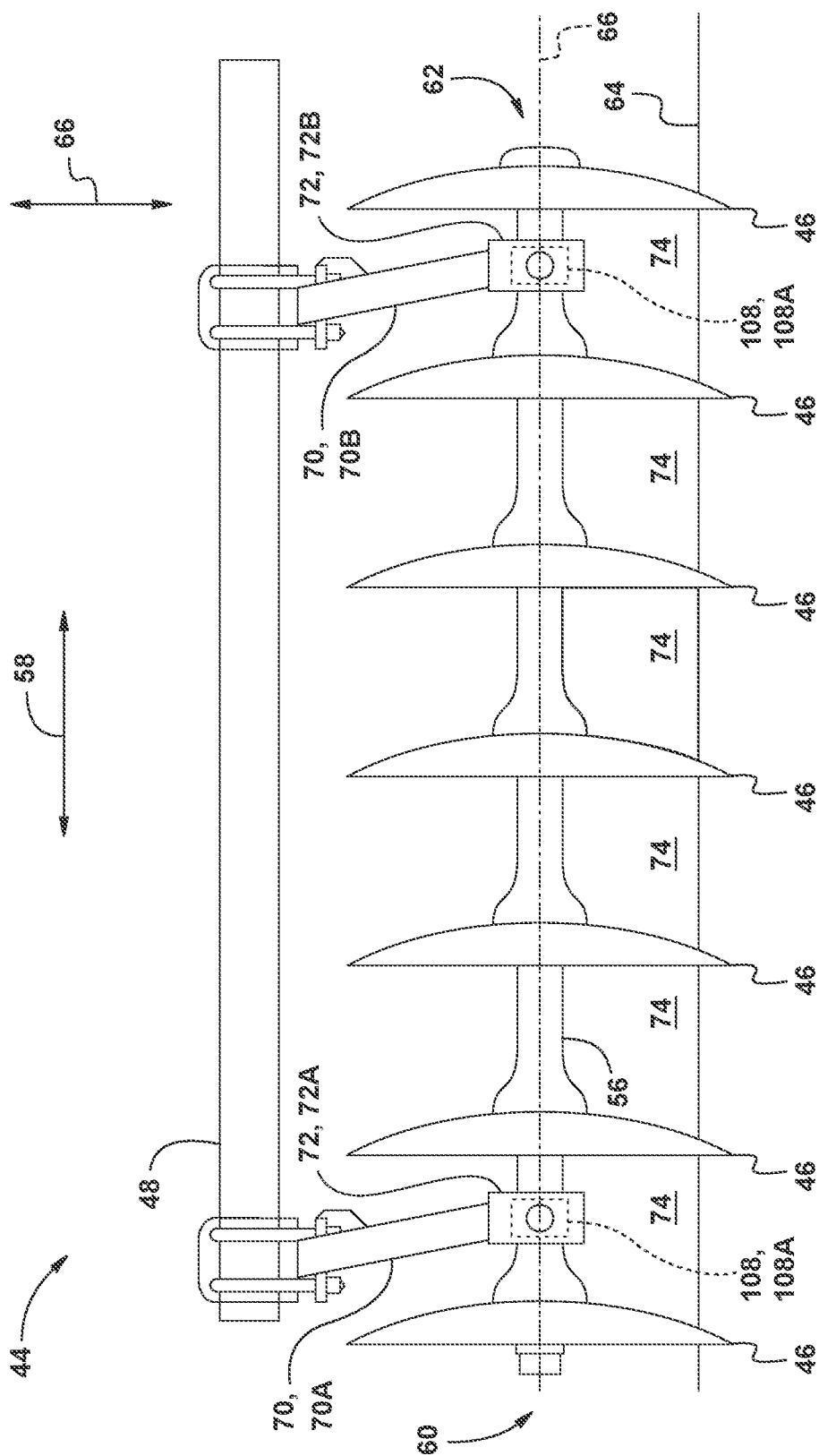
FIG. 3 illustrates a front view of one embodiment of a disk gang of a tillage implement in accordance with aspects of the present subject matter.

Referring now to FIG. 3, a front view of one embodiment of a disk gang 44 of the implement 10 is illustrated in accordance with aspects of the present subject matter. Specifically, in several embodiments, the disk gang 44 may include a disk gang shaft 56 that extends along an axial direction or length of the disk gang 44 (e.g., as indicated by arrow 58 in FIG. 3) between a first end 60 and a second end 62. As shown, the disks 46 are coupled to the disk gang shaft 56 and spaced apart from each other along the axial direction 58. As the implement 10 is moved across a field, the disks 46 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 44 is supported relative to the corresponding support arm 48 of the tillage implement 10. Specifically, in several embodiments, a pair of hangers 70 (e.g., C-hangers) support the disk gang 44 at a position below the support arm 48. For example, in one embodiment, one end of each hanger 70 may be coupled to the support arm 48, while the opposing end of each hanger 70 is coupled to a bearing block 72. The bearing blocks 72, in turn, are rotatably coupled to the disk gang shaft 56. However, in alternative embodiments, the disk gang 44 may have any other suitable configuration.

As shown in FIG. 3, the disk gang 44 defines a plurality of more flow zones 74 through which field materials may flow during the operation of the implement 10. Specifically, in several embodiments, each flow zone 74 may be defined directly between a pair of adjacent disks 46 in the axial direction 58. In this respect, as the implement 10 travels across the field, field materials (e.g., soil, residue, rocks, and/or the like) may flow through the flow zone 74 as such field materials are being tilled or otherwise processed by the disks 46. During normal, non-plugged operation of the disk gang 44, substantially all of the field materials being processed by the disk gang 44 flow through the flow zones 74, with only minimal field materials like becoming trapped or otherwise accumulating within the flow zones 74. However, when a sufficient amount of field materials accumulates with one or more of the flow zones 74 such that rotation of the disks 46 is impacted (e.g., the rotational speed of the disks 46 is reduced or the disks 46 stop rotating), the disk gang 44 is considered plugged.

The configuration of the tillage implement 10 and the work vehicle 12 described above and shown in FIGS. 1-3 is provided only to place the present subject matter in an exemplary field of use. Thus, the present subject matter may be readily adaptable to any manner of implement and/or vehicle configuration.

F Furthermore, one or more load sensors 108 are installed on the tillage implement 10. In general, each load sensor 108 is configured to generate data indicative of the load (or a portion of the load) being applied to one of the disk gangs 44 during a tillage operation. Such loads result from engagement between the disks 46 and the soil into which the disks 46 have penetrated. As will be described below, the data generated by the load sensor(s) 108 is, in turn, be used to determine an operational status of the implement 10 (e.g., when one or more of the disk gangs 44 are plugged).

In several embodiments, each disk gang 44 on the implement 10 includes a pair of load sensors 108. For example, in the embodiment illustrated in FIG. 3, the disk gang 44 includes a first load sensor 108A coupled between a first hanger 70A and the disk gang shaft 56 and a second load sensor 108B coupled between a second hanger 70B and the disk gang shaft 56. In one embodiment, the first and second load sensors 108A, 108B may be positioned within first and second bearing blocks 72A, 72B coupled between the disk gang shaft 56 and the first and second hangers 70A, 70B, respectively. However, in alternative embodiments, the tillage implement 10 may include any other suitable number of load sensors 108.

The load sensors 108 may correspond to any suitable sensing devices configured to generate data indicative of the loads acting on the disk gangs 44, such as load cells, strain gauges, and/or the like.

Figure 4:
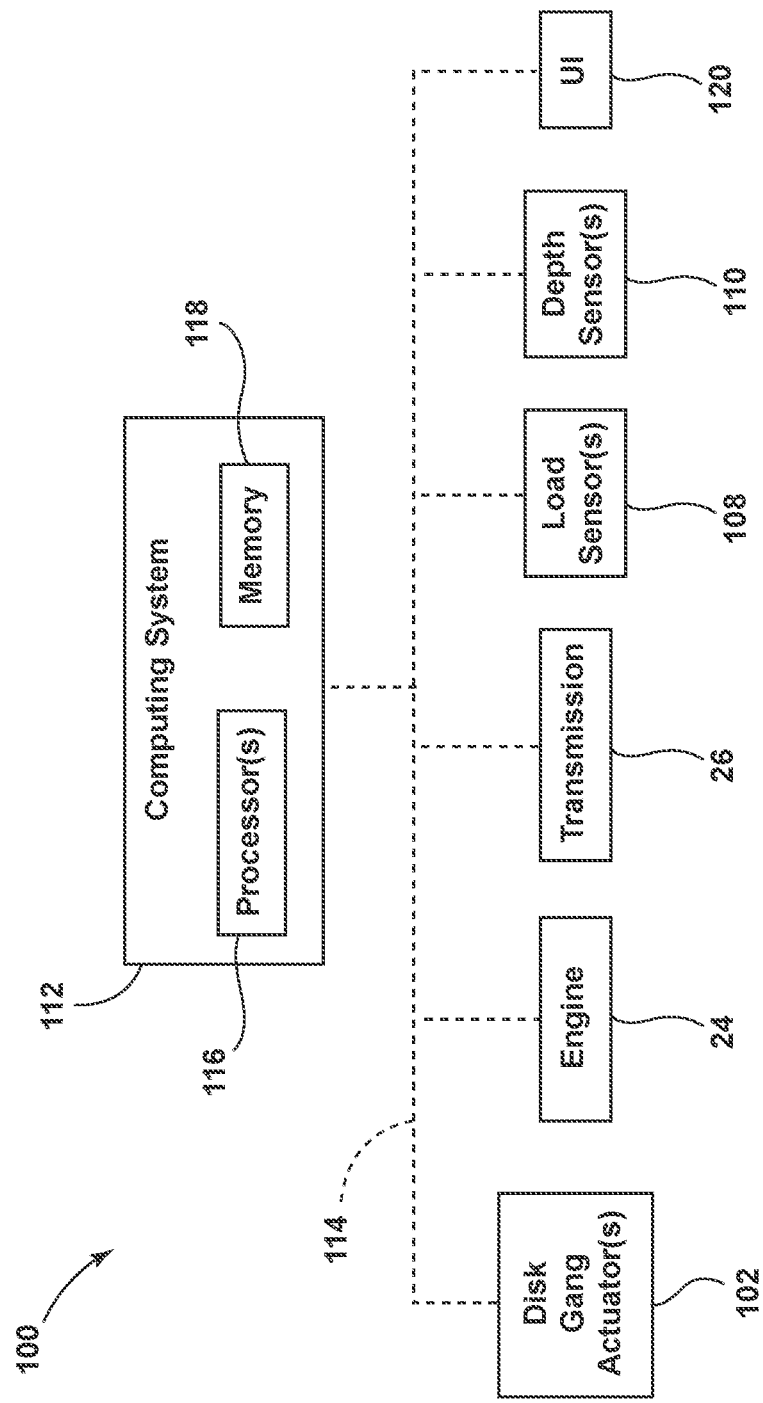
FIG. 4 illustrates a schematic view of one embodiment of a system for determining operational status of a tillage implement in accordance with aspects of the present subject matter.

Referring now to FIG. 4, a schematic view of one embodiment of a system 100 for determining operational status of a tillage implement is illustrated in accordance with aspects of the present subject matter. In general, the system 100 will be described herein with reference to the tillage implement 10 and the work vehicle 12 described above with reference to FIGS. 1-3. However, the disclosed system 100 may generally be utilized with tillage implements having any other suitable implement configuration and/or with work vehicles having any other suitable vehicle configuration.

As shown in FIG. 4, the system 100 generally includes one or more components of the tillage implement 10 and/or the work vehicle 12. For example, in the illustrated embodiment, the system 100 includes the engine 24 and the transmission 26 of the work vehicle 12, one or more of disk gang actuators 102 of the tillage implement 10, and one or more of the load sensors 108 of the tillage implement 10.

Additionally, the system 100 may include one or more depth sensors 110 of the tillage implement 10. In general, each depth sensor 110 is configured to generate data indicative of the nominal penetration depth to which the disks 46 of one of the disk gangs 44 penetrate into the soil during a tillage operation. The nominal penetration depth of the disk gang 44, in turn, is the selected or set penetration depth associated with the disk gang 44. For example, in some embodiments, the disk gang 44 may include disks of varying sizes. In such embodiments, there may be several standard disks having the same diameter and a few other disks having smaller diameters than the standard disks, with the standard disks being more numerous than the smaller disks. Thus, the nominal penetration depth may be the penetration depths of the standard disks.

The depth sensor(s) 110 may correspond to any suitable sensor(s) or sensing device(s) configured to generate data indicative of the nominal penetration depth(s) of the disk gang(s) 44. For example, in one embodiment, the depth sensor(s) 110 correspond to a linear potentiometer(s) configured to measure the extension/retraction of the rod(s) 104 of the disk gang actuator(s) 102. Such extension/retraction of the rod(s) 104 can then be used to determine the nominal penetration depth of the disk(s) 46 on the corresponding disk gang 44. However, in alternative embodiments, the depth sensor(s) 110 may have any other suitable configuration.

Moreover, the system 100 includes a computing system 112 communicatively coupled to one or more components of the tillage implement 10, the work vehicle 12, and/or the system 100 to allow the operation of such components to be electronically or automatically controlled by the computing system 112. For instance, the computing system 112 may be communicatively coupled to the load sensors 108 and/or the depth sensors 110 via a communicative link 114. As such, the computing system 112 may be configured to receive data from the sensors 108, 110. Furthermore, the computing system 112 may be communicatively coupled to the engine 24, the transmission 26, and/or the disk gang actuators 102 via the communicative link 114. In this respect, the computing system 112 may be configured to control the operation of the components 24, 26, 102. In addition, the computing system 112 may be communicatively coupled to any other suitable components of the implement 10, the vehicle 12, and/or the system 100.

In general, the computing system 112 may comprise one or more processor-based devices, such as a given controller or computing device or any suitable combination of controllers or computing devices. Thus, in several embodiments, the computing system 112 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as an implement controller, an engine controller, a transmission controller, and/or the like. Furthermore, the communication link 114 may correspond to a single communicative link (e.g., a CAN bus) or a plurality of communicative links (e.g., CAN bus and ISOBUS).

In addition, the system 100 may also include a user interface 120. More specifically, the user interface 120 may be configured to provide feedback from the computing system 112 (e.g., feedback associated with the operational status of the tillage implement 10) to the operator. As such, the user interface 120 may include one or more feedback devices (not shown), such as display screens, speakers, warning lights, and/or the like, which are configured to provide feedback from the computing system 112 to the operator. As such, the user interface 120 may, in turn, be communicatively coupled to the computing system 112 via the communicative link 114 to permit the feedback to be transmitted from the computing system 112 to the user interface 120. Furthermore, some embodiments of the user interface 120 may include one or more input devices, such as touchscreens, keypads, touchpads, knobs, buttons, sliders, switches, mice, microphones, and/or the like, which are configured to receive inputs (e.g., inputs associated with the number and/or sizes of the disks 46 on each disk gang 44) from the operator. In one embodiment, the user interface 120 may be mounted or otherwise positioned within the cab 22 of the work vehicle 12. However, in alternative embodiments, the user interface 120 may mounted at any other suitable location.

Figure 5:
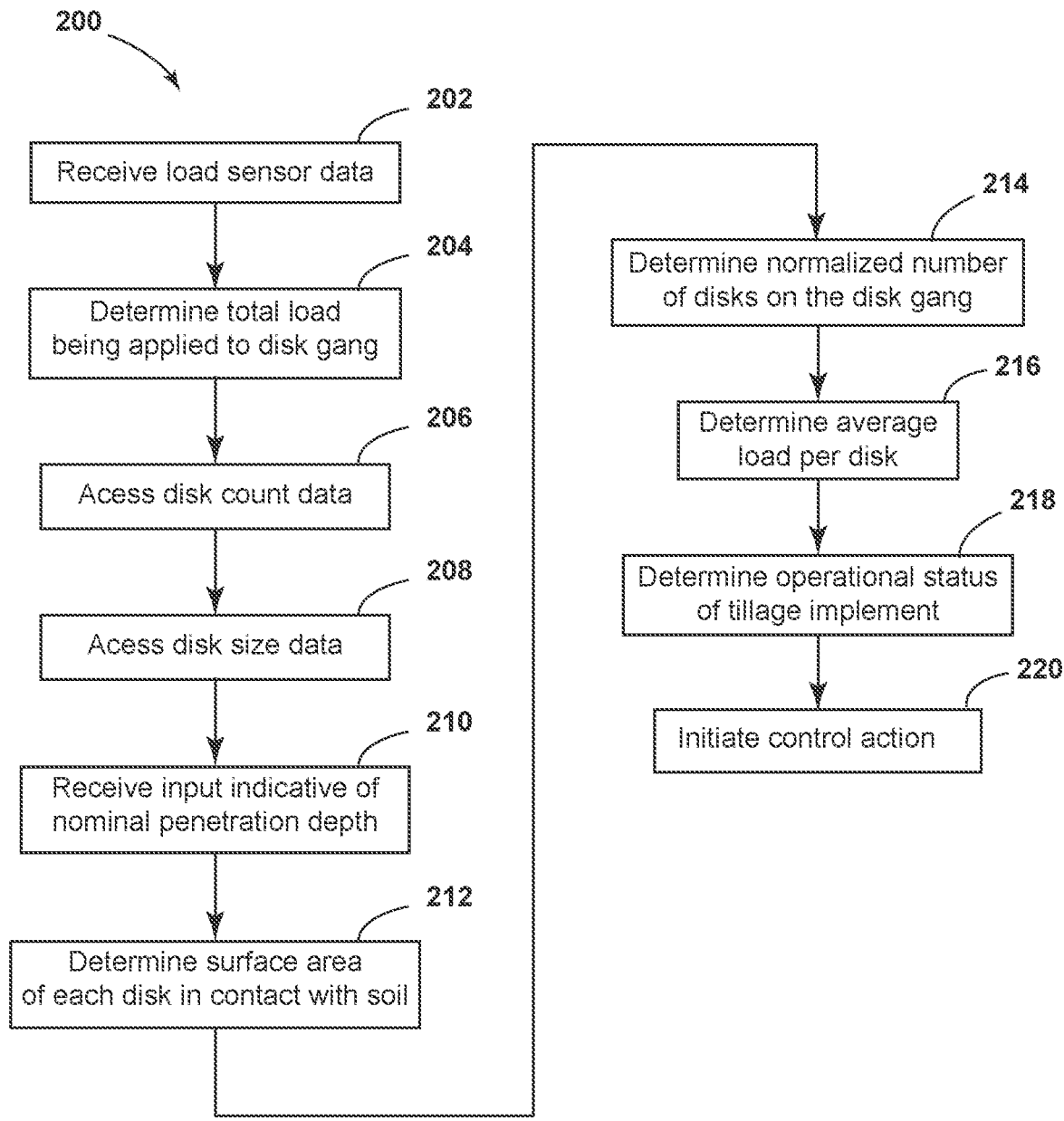
FIG. 5 illustrates a flow diagram providing one embodiment of control logic for determining operational status of a tillage implement in accordance with aspects of the present subject matter.

Referring now to FIG. 5, a flow diagram of one embodiment of control logic 200 that may be executed by the computing system 112 (or any other suitable computing system) for determining operational status of a tillage implement is illustrated in accordance with aspects of the present subject matter. Specifically, the control logic 200 shown in FIG. 5 is representative of steps of one embodiment of an algorithm that can be executed to determine the operational status of a tillage implement without requiring substantial computing resources and/or processing time. However, in other embodiments, the control logic 200 may be used in association with any other suitable system, application, and/or the like for determining the operational status of a tillage implement.

As shown in FIG. 5, at (202), the control logic 200 includes receiving load sensor data indicative of the load being applied to a disk gang of a tillage implement. Specifically, as mentioned above, in several embodiments, the computing system 112 may be communicatively coupled to the load sensor(s) 108 via the communicative link 114. In this respect, as the implement/vehicle 10/12 travels across the field to perform a tillage operation thereon, the computing system 112 may receive data from the load sensor(s) 108. Such data may, in turn, be indicative of the load(s) being applied to the disk gang(s) 44, such as due to the engagement between the disks 46 on the disk gang(s) 44 and the soil in the field.

Furthermore, at (204), the control logic 200 includes determining the total load being applied to the disk gang based on the received load sensor data. Specifically, in several embodiments, the computing system 112 may be configured to monitor the total load(s) being applied to the disk gang(s) 44 based on the load sensor data received at (202). For instance, the computing system 112 may include a look-up table, suitable mathematical formula, and/or algorithms stored within its memory device(s) 118 that correlates the received load sensor data to the load(s) being applied to the disk gang(s) 44.

Additionally, at (206), the control logic 200 includes accessing disk count data indicative of the non-normalized number of disks on the disk gang. Specifically, in several embodiments, the computing system 112 may be configured to access disk count data indicative of the non-normalized number(s) of disks on the disk gang(s) 44. Each non-normalized number of disks, in turn, corresponds to the integer number of disks on the corresponding disk gang 44. For example, in one embodiment, the computing system 112 may access the disk count data from its memory device(s) 118. In such an embodiment, the non-normalized number of disks on each disk gang 44 may be stored with the memory device(s) 118. In another embodiment, the operator may input the non-normalized number(s) of disks on the disk gang(s) 44 to the user interface 120. Thereafter, disk count data indicative of the non-normalized number(s) of disks on the disk gang(s) 44 may be transmitted from the user interface 120 to the computing system 112 via the communicative link 114. However, in alternative embodiments, the computing system 112 may access the disk count data in any other suitable manner.

Moreover, at (208), the control logic 200 includes accessing disk size data indicative of the size of each disk on the disk gang. Specifically, in several embodiments, the computing system 112 may be configured to access disk size data indicative of the size (e.g., the diameter, the radius, etc.) of each disk 46 on the disk gang(s) 44. For example, in one embodiment, the computing system 112 may access the disk size data from its memory device(s) 118. In such an embodiment, the size of each disk 46 on each disk gang 44 may be stored with the memory device(s) 118. In another embodiment, the operator may input the sizes of the disks 46 on the disk gang(s) 44 to the user interface 120. Thereafter, the disk size data indicative of the sizes of the disks 46 on the disk gang(s) 44 may be transmitted from the user interface 120 to the computing system 112 via the communicative link 114. However, in alternative embodiments, the computing system 112 may access the disk size data in any other suitable manner.

In addition, at (210), the control logic 200 includes receiving an input indicative of the nominal penetration depth of the disks on the disk gang. Specifically, in several embodiments, the computing system 112 may be configured to receive an input(s) indicative of the nominal penetration depth(s) of the disks on the disk gang(s) 44. For example, as mentioned above, in some embodiments, the computing system 112 may be communicatively coupled to the depth sensor(s) 110 via the communicative link 114. In this respect, as the implement/vehicle 10/12 travels across the field to perform the tillage operation, the computing system 112 may receive data from the depth sensor(s) 110. Such data may, in turn, be indicative of the nominal depth(s) of the disks 46 of the disk gang(s) 44. In other embodiments, the operator may input the nominal depth(s) of the disks 46 on the disk gang(s) 44 to the user interface 120. Thereafter, data indicative of the nominal depth(s) of the disks 46 on the disk gang(s) 44 may be transmitted from the user interface 120 to the computing system 112 via the communicative link 114. However, in alternative embodiments, the computing system 112 may receive any other suitable input(s) indicative of the nominal depth(s) of the disks 46 of the disk gang(s) 44.

As shown in FIG. 5, at (212), the control logic 200 includes determining the surface area of each disk that is in contact with the soil based on the size of each disk and the nominal penetration depth of the disks. Specifically, in several embodiments, the computing system 112 may be configured to determine the surface area of each disk 46 that is in contact with the soil based on the size of each disk 46 as accessed at (208) and the nominal penetration depth of the of disks 46 as received at (210). For instance, the computing system 112 may include a look-up table, suitable mathematical formula, and/or algorithms stored within its memory device(s) 118 that correlates the size of each disk 46 and the nominal penetration depth of the disks 46 to the surface area of each disk 46 that is in contact with the soil.

Furthermore, at (214), the control logic 200 includes determining the normalized number of disks on the disk gang based on the non-normalized number of disks on the disk gang and the surface area of each disk on the disk gang that is in contact with the soil. Specifically, in several embodiments, the computing system 112 is configured to determine the normalized number(s) of disks on the disk gang(s) 44 based on the non-normalized number(s) of disks on the disk gang(s) 44 accessed at (206) and the surface area of each disk 46 that is in contact with the soil determined at (212). For instance, the computing system 112 may include a look-up table, suitable mathematical formula, and/or algorithms stored within its memory device(s) 118 that correlates the non-normalized number(s) of disks on the disk gang(s) 44 and the surface area of each disk 46 that is in contact with the soil to the normalized number(s) of disk(s) on the disk gang(s) 44. Unlike the non-normalized number(s) of disks, the normalized number(s) of disks may be a non-integer number(s).

In some embodiments, when determining the normalized number of disks for a given disk gang, the ratio of the surface area of each disk that is in contact with the soil on the given disk gang to the surface area of a standard disk that is in contact with the soil is determined. The standard disk is, in turn, a selected size of one of the disks on the given disk gang, such as the most common disk size. Thereafter, in such embodiments, the ratio associated with each disk on the given disk gang is summed to obtain the normalized number of disks for a given disk gang. For example, consider a disk gang having ten large disks and two small disks 46. Additionally, assume that the ten large disks are considered the standard size disks. In this respect, the ratio associated with the large disks is one. Moreover, assume that the surface area of each small disk that is contact with the soil is eighty percent of the surface area of the standard size disks that is contact with the soil. As such, the ratio associated with the small disks is 0.8. Accordingly, the normalized number of disks for the given disk gang would 11.6.

Additionally, at (216), the control logic 200 includes determining the average load per disk being applied to the disk gang based on the determined total load and the determined normalized number of disks. Specifically, in several embodiments, the computing system 112 is configured to determine the average load(s) per disk being applied to the disk gang(s) 44 based on the total load(s) determined at (204) and the normalized number(s) of disks determined at (214). For example, the computing system 112 may divide the total load being applied to each disk gang 44 by the corresponding normalized number of disks on the given disk gang 44.

Moreover, at (218), the control logic 200 includes determining the operational status of the tillage implement based on the determined average load per disk. Specifically, in several embodiments, the computing system 112 is configured to determine the operational status of the tillage implement 10 based on the average load(s) per disk of the disk gang(s) 44 determined at (216).

In some embodiments, the operational status of the tillage implement 10 may correspond to a plug status value associated with each disk gang 44. For example, in such embodiments, the computing system 112 may be configured to compare the determined average load per disk for each disk gang 44 of the implement 10 to a threshold value. Thereafter, when the determined average load per disk for a given disk gang 44 exceeds the threshold value, the computing system 112 may determine that the given disk gang 44 is plugged (e.g., output a plug status value indicating that the given disk gang is plugged). Conversely, when the determined average load per disk for a given disk gang 44 is equal to or falls below the threshold value, the computing system 112 may determine that the given disk gang 44 is not plugged (e.g., output a plug status value indicating that the given disk gang is not plugged).

Additionally, in other embodiments, the operational status of the tillage implement 10 may correspond to the levelness of implement frame 28. For example, in such embodiments, the computing system 112 may be configured to compare the determined average load(s) per disk for the disk gang(s) 44 on one side or end of the implement 10 to the determined average load(s) per disk for the disk gangs 44 on the opposed side or end of the implement 10. Thereafter, when the determined average loads per disk for these disk gangs 44 differ by more than a threshold amount, the computing system 112 may determine that the implement frame 28 is not level. Conversely, when the determined average loads per disk for these disk gang 44 differ by the threshold amount or less, the computing system 112 may determine that the implement frame 28 is level.

In alternative embodiments, the operational status of the tillage implement 10 may correspond to any other suitable parameter(s).

Furthermore, at (220), the control logic 200 includes initiating a control action associated with adjusting the operation of the tillage implement based on the determined operational status. Specifically, in several embodiments, the computing system 112 may be configured to initiate one or more control actions associated with adjusting the operation of the tillage implement 10 based on the operational status determined at (218). For example, in one embodiment, the control action(s) include providing a notification to the operator of the implement/vehicle 10/12 indicative of the operational status of the implement 10. In such an embodiment, the computing system 112 may transmit suitable control signals to the user interface 120 instructing the user interface 120 to provide the appropriate notification to the operator.

Alternatively, or additionally, the control action(s) include adjusting an operating parameter(s) of the implement 10 and/or the vehicle 12. For example, in one embodiment, the control action(s) may include adjusting (e.g., reducing) the ground speed of the implement/vehicle 10/12. In such an embodiment, the computing system 112 may transmit suitable control signals to the engine 24 and/or transmission 26 of the vehicle 12 instructing the engine 24 and/or transmission 26 to adjust (e.g., reduce) the ground speed of the implement/vehicle 10/12. In a further embodiment, the control action(s) include adjusting the position of the disk gang(s) 44 relative to the implement frame 28. In such an embodiment, the computing system 112 may transmit suitable control signals to the disk gang actuator(s) 102 of the implement 10 instructing the disk gang actuator(s) 102 to adjust position of the disk gang(s) 44 relative to the implement frame 28 (e.g., to adjust the force(s) being applied to and/or the penetration depth(s) of the disk gang(s) 44).

As mentioned above, in some embodiments, the operational status of the tillage implement 10 is a plugging status value(s). In such embodiments, when the plugging status value(s) indicates that one or more disk gangs 44 are plugged, the computing system 112 may initiate notification of the operator that one or more disk gangs 44 are plugged, a reduction in the ground speed of the implement/vehicle 10/12, and/or an adjustment of the position of the disk gang(s) 44 relative to the implement frame 28.

Moreover, as mentioned above, in some embodiments, the operational status of the tillage implement 10 is the levelness of the frame 28. In such embodiments, when the frame 28 is not level, the computing system 112 may initiate notification of the operator that the frame 28 is not level and/or a reduction in the ground speed of the implement/vehicle 10/12.

In alternative embodiments, any other suitable control actions may be initiated at (220).

Figure 6:
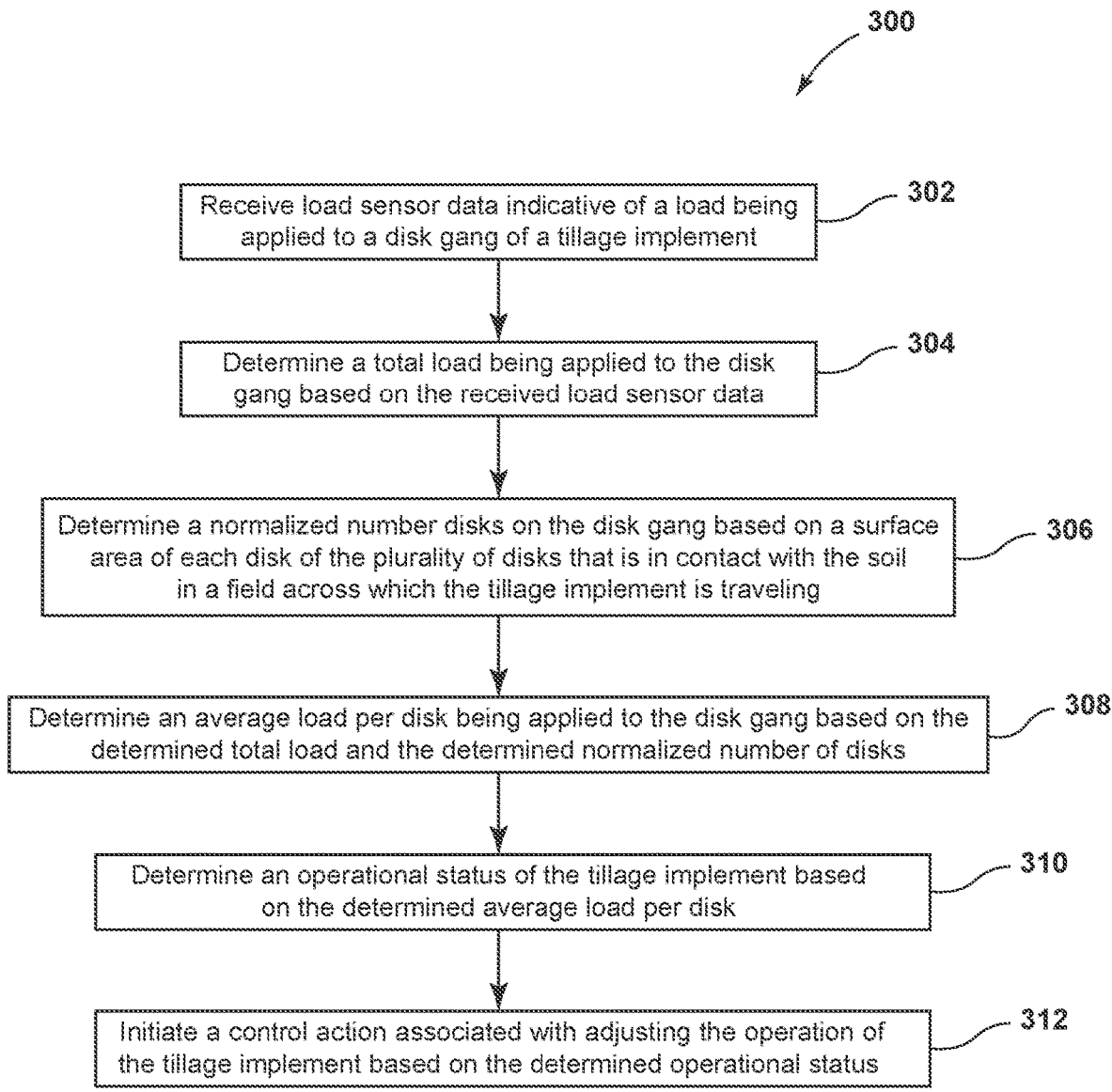
FIG. 6 illustrates a flow diagram of one embodiment of a method for determining operational status of a tillage implement in accordance with aspects of the present subject matter.

Referring now to FIG. 6, a flow diagram of one embodiment of a method 300 for determining operational status of a tillage implement is illustrated in accordance with aspects of the present subject matter. In general, the method 300 will be described herein with reference to the tillage implement 10, the work vehicle 12, and the system 100 described above with reference to FIGS. 1-5. However, it should be appreciated by those of ordinary skill in the art that the disclosed method 300 may generally be implemented with any tillage implements having any suitable implement configuration, work vehicles having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, load sensor data indicative of the load being applied to a disk gang of a tillage implement. For instance, as described above, the computing system 112 may be configured to receive load sensor data from the load sensor(s) 108. The received load sensor data is, in turn, indicative of load(s) being applied to the disk gang(s) 44 of the tillage implement 10.

Furthermore, at (304), the method 300 includes determining, with the computing system, the total load being applied to the disk gang based on the received load sensor data. For instance, as described above, the computing system 112 may be configured to determine the total load(s) being applied to the disk gang(s) 44 based on the received load sensor data Additionally, at (306), the method 300 includes determining, with the computing system, the normalized number of disks on the disk gang based on a surface area of each disk of the plurality of disks that is in contact with soil in a field across which the tillage implement is traveling. For instance, as described above, the computing system 112 may be configured to determine the normalized number(s) of disks on the disk gang(s) 44 based on the surface area of each disk 46 that is in contact with the soil in the field.

Moreover, at (308), the method 300 includes determining, with the computing system, the average load per disk being applied to the disk gang based on the determined total load and the determined normalized number of disks. For instance, as described above, the computing system 112 may be configured to determine the average load per disk being applied to the disk gang 44 based on the determined total load and the determined normalized number of disks.

In addition, at (310), the method 300 includes determining, with the computing system, an operational status of the tillage implement based on the determined average load per disk. For instance, as described above, the computing system 112 may be configured to determine the operational status of the tillage implement 10 based on the determined average load per disk. The operational status may, in turn, be whether the disk gang(s) 44 is plugged, the levelness of the implement frame 28, and/or the like.

Furthermore, at (312), the method 300 includes initiating, with the computing system, a control action associated with adjusting the operation of the tillage implement based on the determined operational status. For instance, as described above, the computing system 112 may be configured to initiate one or more control actions associated with adjusting the operation of the tillage implement 10 based on the determined operational status. Such control action(s) may include providing a notification to the operator of the implement/vehicle 10/12, adjusting the ground speed of the implement/vehicle 10/12, adjusting the position of the disk gang(s) 44 relative to the implement frame 28, and/or the like.

It is to be understood that the steps of the control logic 200 and the method 300 are performed by the computing system 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 112 described herein, such as the control logic 200 and the method 300, is implemented in software code or instructions which are tangibly stored on a tangible computer readable medium. The computing system 112 loads the software code or instructions via a direct interface with the computer readable medium or via a wired and/or wireless network. Upon loading and executing such software code or instructions by the computing system 112, the computing system 112 may perform any of the functionality of the computing system 112 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A tillage implement, comprising:
a frame;
a disk gang supported on the frame, the disk gang including a disk gang shaft and a plurality of disks spaced apart from each other along the disk gang shaft;
one or more load sensors configured to generate data indicative of a load being applied to the disk gang; and
a computing system communicatively coupled to the one or more load sensors, the computing system configured to:
determine a total load being applied to the disk gang based on the data generated by the one or more load sensors;
determine a normalized number of disks on the disk gang based on a surface area of each disk of the plurality of disks that is in contact with soil in a field across which the tillage implement is traveling;
determine an average load per disk being applied to the disk gang based on the determined total load and the determined normalized number of disks; and
determine an operational status of the tillage implement based on the determined average load per disk.

2. The tillage implement of claim 1, wherein the operational status of the tillage implement comprises a plug status value of the disk gang.

3. The tillage implement of claim 1, wherein the operational status of the tillage implement comprises a levelness of the frame.

4. The tillage implement of claim 1, further comprising:
first and second hangers coupling the disk gang to the frame.

5. The tillage implement of claim 4, wherein the one or more load sensors comprises a first load sensor coupled between the first hanger and the disk gang shaft and a second load sensor coupled between the second hanger and the disk gang shaft.

6. A system for determining operational status of a tillage implement, the system comprising:
   a disk gang including a disk gang shaft and a plurality of disks spaced apart from each other along the disk gang shaft;
   one or more load sensors configured to generate data indicative of a load being applied to the disk gang; and
   a computing system communicatively coupled to the one or more load sensors, the computing system configured to:
      determine a total load being applied to the disk gang based on the data generated by the one or more load sensors;
      determine a normalized number of disks on the disk gang based on a surface area of each disk of the plurality of disks that is in contact with soil in a field across which the tillage implement is traveling;
      determine an average load per disk being applied to the disk gang based on the determined total load and the determined normalized number of disks; and
      determine an operational status of the tillage implement based on the determined average load per disk.

7. The system of claim 6, wherein the operational status of the tillage implement comprises a plug status value of the disk gang.

8. The system of claim 6, wherein the operational status of the tillage implement comprises a levelness of a frame of the tillage implement.

9. The system of claim 6, wherein the computing system is further configured to:
   access disk count data indicative of a non-normalized number of disks on the disk gang; and
   determine the normalized number of disks on the disk gang based on the non-normalized number of disks on the disk gang and the surface area of each disk of the plurality of disks that is in contact with the soil.

10. The system of claim 6, wherein the computing system is configured to:
    access disk size data indicative of a size of each disk;
    receive an input indicative of a nominal penetration depth of the plurality of disks; and
    determine the surface area of each disk of the plurality of disks that is in contact with the soil based on the size of each disk and the nominal penetration depth of the plurality of disks.

11. The system of claim 6, wherein the computing system is further configured to:
    initiate a control action associated with adjusting an operation of the tillage implement based on the determined operational status.

12. The system of claim 11, wherein the control action comprises notifying an operator of the tillage implement of the operational status.

13. The system of claim 11, wherein the control action comprises adjusting a ground speed of the tillage implement.

14. The system of claim 11, wherein the control action comprises adjusting a position of the disk gang relative to a frame of the tillage implement.

15. A method for determining operational status of a tillage implement, the tillage implement including a disk gang having a disk gang shaft and a plurality of disks spaced apart from each other along the disk gang shaft, the method comprising:
    receiving, with a computing system, load sensor data indicative of a load being applied to the disk gang;
    determining, with the computing system, a total load being applied to the disk gang based on the received load sensor data;
    determining, with the computing system, a normalized number of disks on the disk gang based on a surface area of each disk of the plurality of disks that is in contact with soil in a field across which the tillage implement is traveling;
    determining, with the computing system, an average load per disk being applied to the disk gang based on the determined total load and the determined normalized number of disks;
    determining, with the computing system, an operational status of the tillage implement based on the determined average load per disk; and
    initiating, with the computing system, a control action associated with adjusting an operation of the tillage implement based on the determined operational status.

16. The method of claim 15, wherein the operational status of the tillage implement comprises a plug status value of the disk gang.

17. The method of claim 15, wherein the operational status of the tillage implement comprises a levelness of a frame of the tillage implement.

18. The method of claim 15, further comprising:
    accessing, with the computing system, disk count data indicative of a non-normalized number of disks on the disk gang,
    wherein determining the normalized number of disks on the disk gang comprises determining, with the computing system, the normalized number of disks on the disk gang based on the non-normalized number of disks on the disk gang and the surface area of each disk of the plurality of disks that is in contact with the soil.

19. The method of claim 15, further comprising:
    accessing, with the computing system, disk size data indicative of a size of each disk;
    receiving, with the computing system, an input indicative of a nominal penetration depth of the plurality of disks; and
    determining, with the computing system, the surface area of each disk of the plurality of disks that is in contact with the soil based on the size of each disk and the nominal penetration depth of the plurality of disks.

20. The method of claim 15, wherein the control action comprises adjusting a ground speed of the tillage implement.

* * * * *